L. ANDERSON.
SHOCK FORMER FOR HARVESTING MACHINES.
APPLICATION FILED APR. 29, 1912.
1,269,516.
Patented June 11, 1918.
6 SHEETS—SHEET 4.
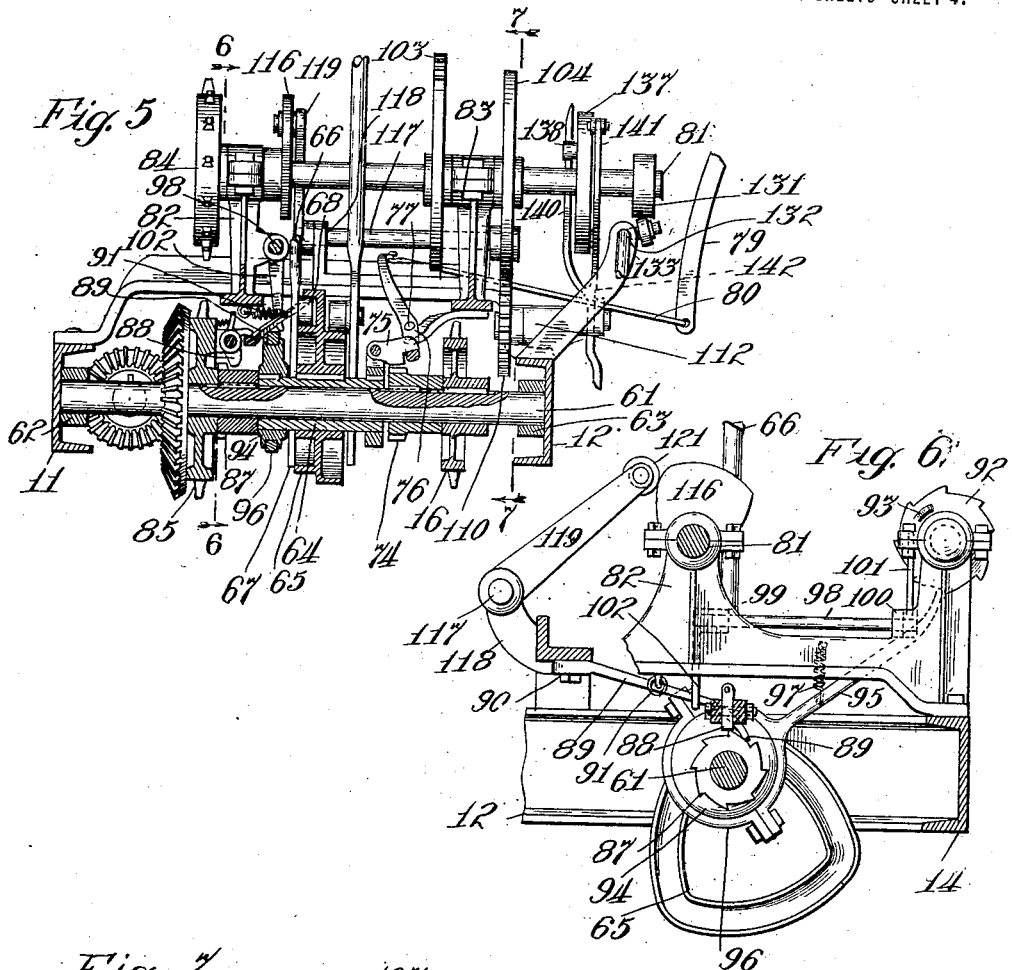
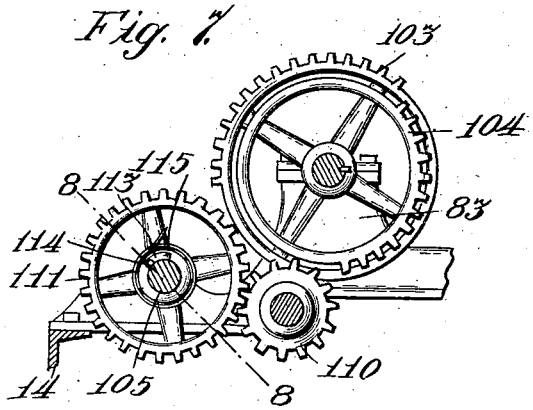
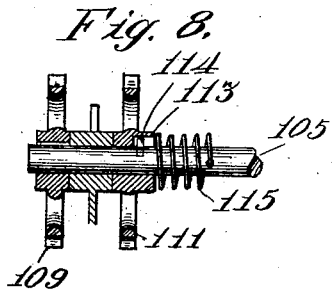
Witnesses
Milton Lenoir
Earl Lenoir
Inventor
Louis Anderson.
By Gillson & Gillson
Attorneys.

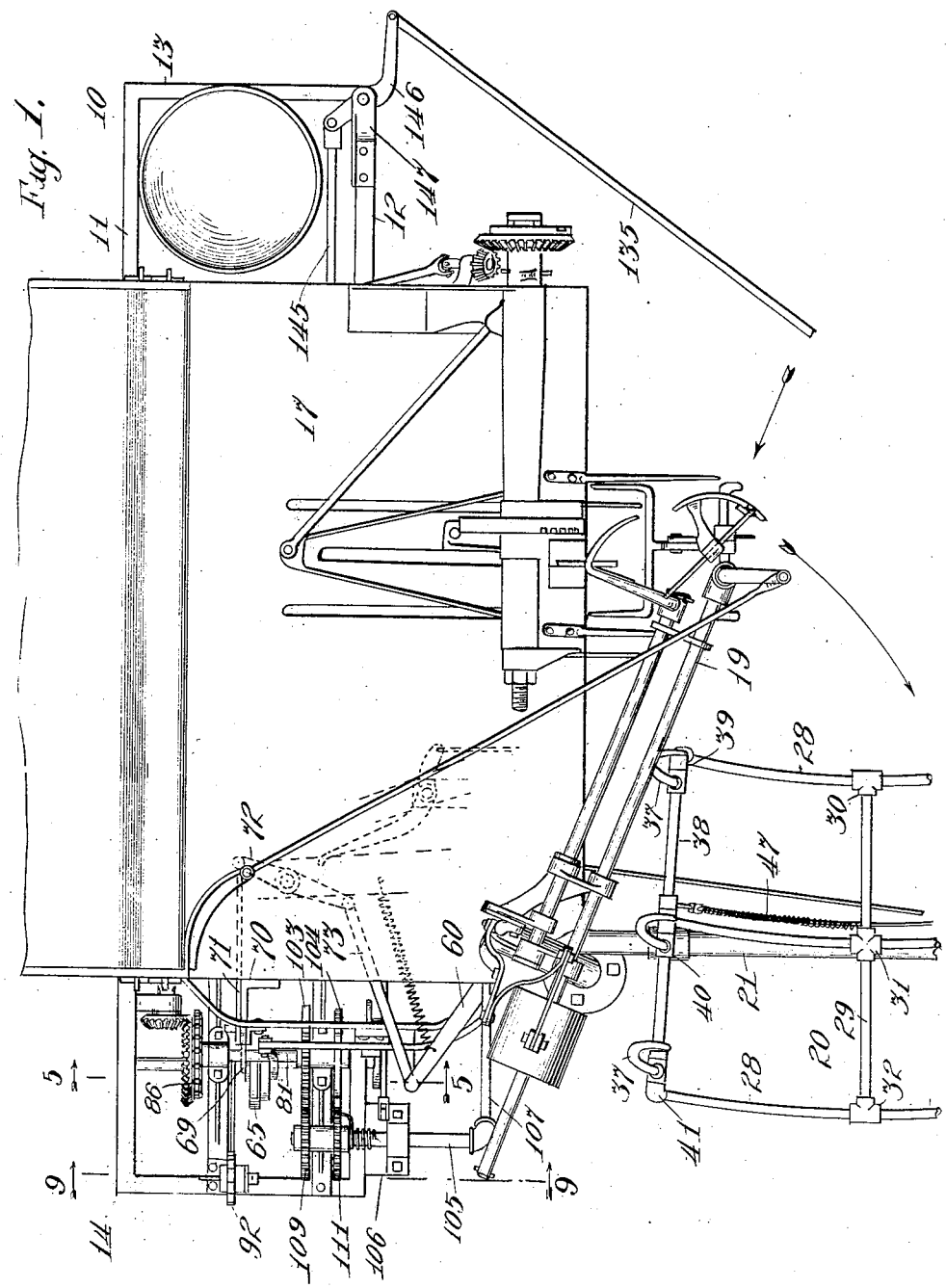

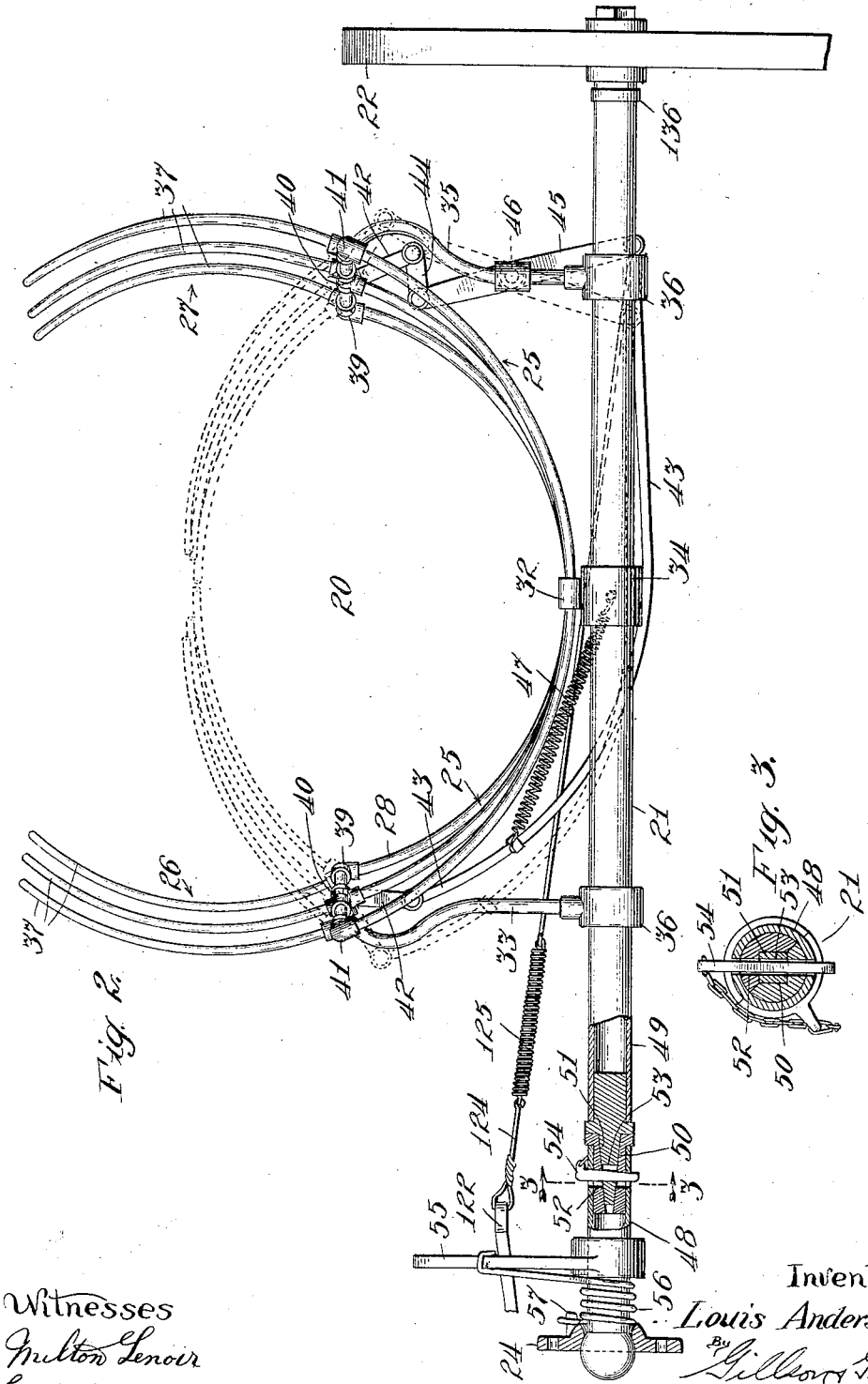

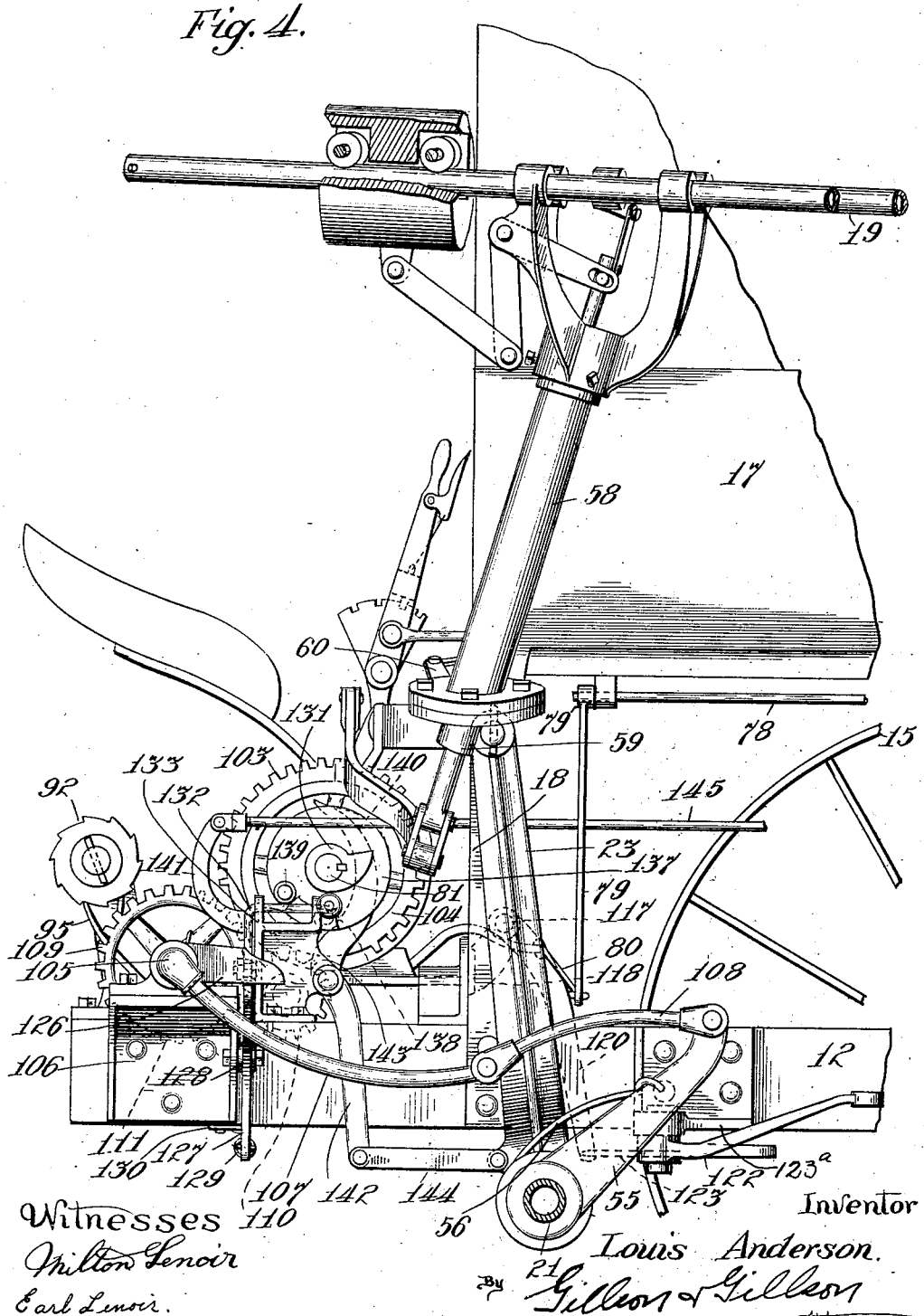

L. ANDERSON.
SHOCK FORMER FOR HARVESTING MACHINES.
APPLICATION FILED APR. 29, 1912.
1,269,516.
Patented June 11, 1918.
6 SHEETS—SHEET 5.
Fig. 9.
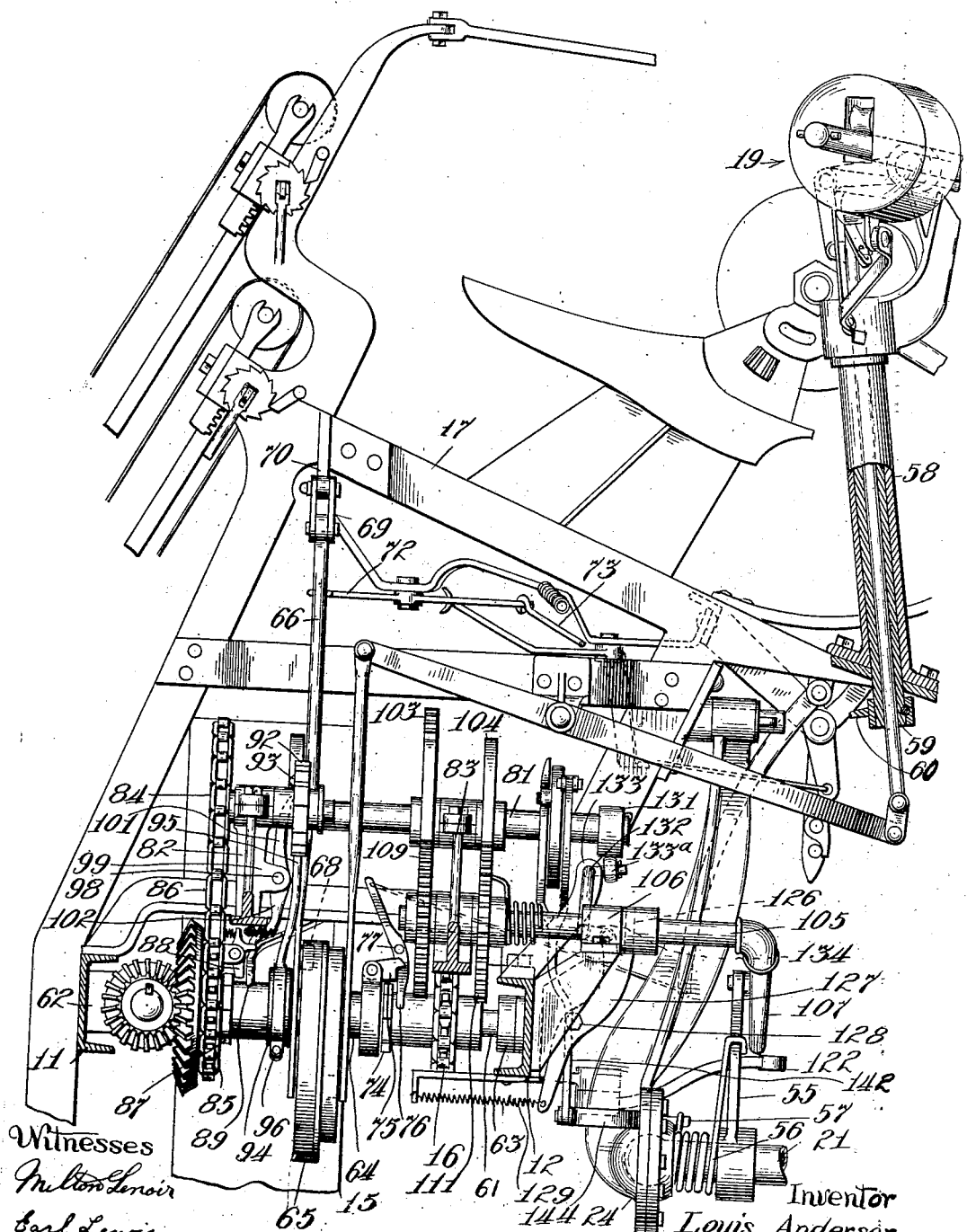
Witnesses
Milton Lenoir
Earl Lenoir
Inventor
Louis Anderson
By 
Attorneys L. ANDERSON.
SHOCK FORMER FOR HARVESTING MACHINES.
APPLICATION FILED APR. 29, 1912.
1,269,516.
Patented June 11, 1918.
6 SHEETS—SHEET 6.
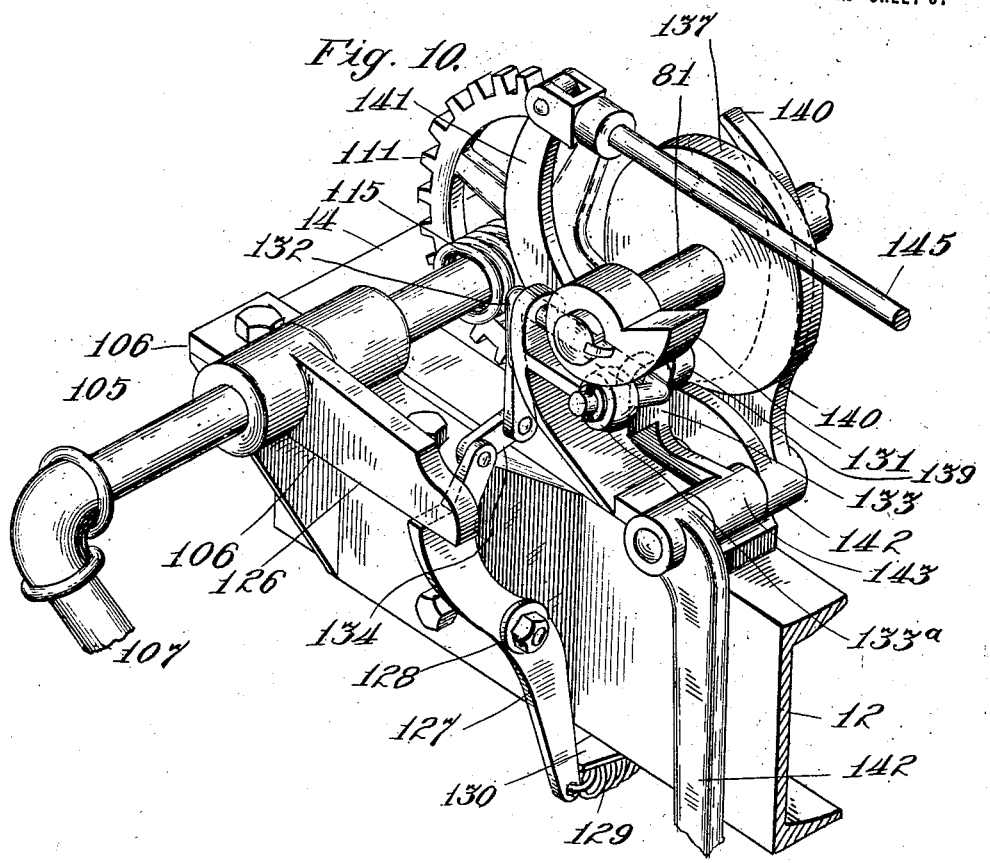
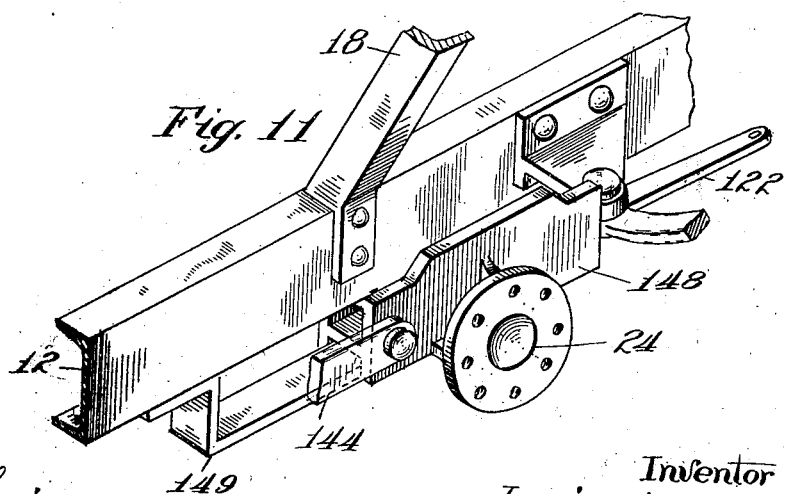

UNITED STATES PATENT OFFICE.

LOUIS ANDERSON, OF CHICAGO, ILLINOIS.

SHOCK-FORMER FOR HARVESTING-MACHINES.

1,269,516.  Specification of Letters Patent.  Patented June 11, 1918.

Application filed April 29, 1912. Serial No. 693,984.

*To all whom it may concern:*

Be it known that I, LOUIS ANDERSON, a citizen of the United States, and resident of Chicago, county of Cook, and State of Illinois, have invented certain new and useful Improvements in Shock-Formers for Harvesting-Machines, of which the following is a specification and which are illustrated in the accompanying drawings, forming a part thereof.

The invention relates to harvesting machines, and particularly to those having provision for collecting the bundles of grain as they are formed by the machine and depositing them upon the ground from time to time in the form of shocks.

The invention contemplates a tilting cradle designed to receive the bundles of grain, and improved means for operating the cradle to discharge the bundles upon the ground in an upright shock.

The object of the invention is to provide a shock former for harvesting machines which shall be of simple construction and efficient in its operation. In the accompanying drawings—

Figure 1 is a detail plan view of a harvesting machine equipped with apparatus provided by the invention;

Fig. 2 is a detail rear elevation showing the shock-forming cradle, and some of the parts being in section;

Fig. 3 is a sectional view taken on the line 3—3 of Fig. 2;

Fig. 4 is a detail side view of the harvesting machine, some of the parts being shown in section;

Fig. 5 is a sectional view taken on the line 5—5 of Fig. 1;

Figs. 6 and 7 are sectional views taken on the lines 6—6 and 7—7, respectively, of Fig. 5;

Fig. 8 is a sectional view taken on the line 8—8 of Fig. 7;

Fig. 9 is a rear elevation of the machine, parts of the frame being shown in section and the plane of the section being indicated by the line 9—9 on Fig. 1;

Fig. 10 is a detail perspective view showing a latch mechanism employed upon the machine; and Fig. 11 is a detail perspective view showing a modified form of construction.

Parts of a harvesting machine are shown in the drawings. This machine has a main frame 10 comprising the side sills 11, 12, and the end sills 13, 14. The machine is principally supported by the usual bull wheel shown at 15. The operative parts of the machine are driven by the movement of the bull wheel 15 over the ground, preferably through a sprocket chain which turns over the bull wheel shaft and over a sprocket wheel 16 shown in Fig. 5.

The harvesting machine will usually be equipped with both reaping and binding mechanism. These mechanisms may be of any well known construction. The reaping mechanism is not shown in the drawings, and only parts of the binding mechanism are illustrated. The binding mechanism serves to tie the grain into bundles upon the inclined table shown at 17. This table is supported over the frame 10, as upon uprights which rise from the side sills, as 12, and one of which is shown at 18. A swinging fork 19 serves for transferring the bundles of grain from the table 17 to the shock-forming mechanism and for turning them end for end in transit between these parts. This bundle transfer mechanism is reserved for a separate application.

The shock forming mechanism includes a cradle, generally designated by the numeral 20. This cradle is preferably located at one side of the frame 10, and for that purpose is mounted upon a horizontal laterally-directed arm 21. Preferably the outer end of the arm 21 is supported in a supplemental carrying wheel 22. The inner end of the arm 21 is most desirably so supported as to permit the arm to be moved in the direction of travel of the machine, independently of the frame 10. As shown in Fig. 4, the inner end of the arm 21 is attached to the lower end of a substantially vertical link 23. This link is swingingly mounted upon the frame 10, as by being pivotally connected at its higher end to the upright 18 (Fig. 4). To permit the arm 21 to be rotated for the purpose of tilting the cradle 20, a ball and socket joint 24 is preferably employed for connecting the inner end of the arm to the lower end of the link 23.

The cradle 20 preferably comprises a rigid intermediate portion 25 and laterally swinging wings 26 and 27. Only the framework of the rigid intermediate portion 25 is shown in the drawings. This consists of a plurality of curved transverse ribs, as 28, and a central longitudinal rib 29. These parts are conveniently formed from piping, and they are rigidly connected at their intersections, as by the unions 30, 31 and 32. Preferably the transverse ribs 28 are curved in differing amounts, whereby to give the cradle a tapering or conical form, its larger end being directed toward the rear, as appears in Figs. 1 and 2. In practice, the framework, consisting of the ribs 28 and 29, will preferably be covered with a suitable flooring (not shown), in order that the rigid part 25 of the cradle may present a smooth surface to the bundles of grain held therein. The rigid part 25 of the cradle 20 is secured to the arm 21 by brackets, as 33, 34 and 35. Each of these brackets has a tubular base, as 36, which surrounds the arm 21 and is rigidly fixed thereon. The wings 26 and 27 of the cradle are rotatably mounted at the opposite edges of the rigid portion 25, and are thus adapted to swing inwardly over the contents of the cradle to compress it. As shown, each of the wings, 26, 27, comprises a plurality of curved ribs 37. These ribs are fixed at one end in a shaft 38. Each of these shafts is rotatably mounted at the corresponding edge of the rigid portion 25 of the cradle, as by being extended through bearings 39, 40 and 41, one of which is mounted upon the adjacent end of each of the ribs 28. Crank arms 42, one of which is mounted on each of the shafts 38 are provided for rotating the shafts to swing the wings. These crank arms are preferably connected by links, as 43, 44, to the opposite ends of a lever 45. The lever 45 is pivotally mounted intermediate its ends upon a rigid part of the cradle, as upon the pivot lug 46 which is carried by the bracket 35. By swinging the lever 45 upon its pivot 46, the wings 26 and 27 are simultaneously moved in opposite directions. A spring 47 reacts between the link 43 and the bracket 34 to normally hold the wings 26 and 27 in the upright position illustrated by full lines in Fig. 2. By swinging the lever 45 against the effort of the spring 47 the wings 26 and 27 are swung inwardly over the rigid portion 25 of the cradle, to the positions indicated by dotted lines in Fig. 2.

Preferably the arm 21 is jointed in order that the cradle 20 may be detached from the frame 10 of the harvesting machine, as when the machine is to be drawn through a gate or upon a road. As shown, the arm 21 is formed in sections, as 48 and 49. The outer end of the section 48 is provided with a tapering socket 50, and the inner end of the section 49 is equipped with a pin 51 having a form complementary to that of the socket 50. The walls of the socket 50 and the pin 51 are transversely apertured, as at 52, 53, to receive a connecting pin or key 54 Preferably the key 54 is of wedge shape, and the apertures 52, 53, are so arranged that as the key 54 is driven to its seat it draws the sections 48, 49, together by a cam action.

For discharging its load upon the ground the cradle 20 is tilted to an upright position in rear of the arm 21, as by rotating the arm 21. For this purpose the arm 21 turns in the ball and socket joint 24 at one end, and in the hub of the carrying wheel 22 at the other end. A crank arm 55 is mounted on the arm 21 for rotating the arm 21. Preferably this crank arm is located adjacent the inner end of the arm 21, and a spring 56 bears against the crank arm to assist in rotating the arm 21 in a direction to raise the cradle 20. As shown, the intermediate portion of the spring 56 is coiled about the arm 21, and the inner end of the spring bears against a fixed stop, as the lug 57. The stop lug 57 is conveniently formed upon the casing of the ball and socket joint 24.

The tilting of the cradle 20, for discharging its load upon the ground, preferably occurs only when a predetermined number of bundles of grain have been deposited in the cradle, as by the swinging of the fork 19. The fork 19 is in turn operated to transfer a bundle of grain from the table 17 to the cradle 20 only when the tying of a bundle of grain has been completed by the binder mechanism. As shown, the fork 19 is mounted to swing about the axis of a tubular post 58. This post rises from a rear corner of the table 17. The fork 19 has a stem 59 which extends downwardly through the tubular post 58, and projects below the same for the attachment thereto of a crank arm 60.

A countershaft 61 may be employed for transmitting power to all of the operative parts of the machine. As shown this countershaft extends transversely across the frame of the machine between the side sills 11 and 12, and is journaled at its opposite ends in bearings 62 and 63 mounted upon the said sills, respectively. The sprocket wheel 16 is preferably directly mounted upon the countershaft 61, and is fixed thereto for continuously driving the same.

The mechanism for swinging the fork 19 comprises a sleeve 64, normally loose on the countershaft 61, and carrying a cam 65. As shown, the cam 65 serves to vertically reciprocate a plunger 66. The lower end of this plunger is bifurcated, as indicated at 67, to straddle the sleeve 64, whereby the plunger is guided by the sleeve. A cam roller 68, mounted on the plunger, coöperates with the cam 65. The higher end of the plunger 66 is connected to one of the arms of a bell crank lever 69 (Fig. 1). This bell crank lever is pivotally mounted upon a fixed part of the frame of the machine, as at 70 (Fig. 1). A link 71 connects the other arm of the bell crank lever 69 with a lever 72. This lever is in turn connected to the crank arm 60, as by a link 73.

Clutch mechanism, consisting of a ratchet 74 fixed upon the countershaft 61 and a pawl arm 75 carried by the sleeve 64, is provided for turning the cam 65 whenever the fork 19 is to be operated. A cam finger 76 normally serves to support the pawl arm 75 and hold it out of engagement with the ratchet wheel 74. This cam finger is pivotally supported intermediate its ends, as at 77 (Fig. 5). A rock shaft of the binder mechanism is shown at 78 (Fig. 4). This rock shaft has a crank arm 79 which is connected to one end of the cam finger 76, as by a link 80. Whenever the rock shaft 78 is operated, as upon the completion of the tying of a bundle of grain, the cam finger 76 is withdrawn from beneath the pawl arm 75, and the sleeve 64 is thereby caused to turn with the countershaft 61 through one revolution. During this turning of the sleeve 64 the cam 65 reciprocates the plunger 66 and operates the fork 19 to transfer a bundle of grain from the table 17 to the cradle 20. At the end of each revolution of the sleeve 64 the pawl arm 75 rides upon the point of the cam finger 76 (Fig. 9) and is raised thereby out of engagement with the ratchet wheel 74, thus bringing the sleeve 64 to rest until the cam finger is again withdrawn by the operation of the rock shaft 78 (Fig. 4).

The parts of the shock forming mechanism are operated through a second countershaft shown at 81 (Fig. 5). This countershaft is journaled upon fixed parts of the frame 10, as upon the standards 82 and 83. Preferably the countershaft 81 is rotated only when a predetermined number of bundles of grain, sufficient to form a shock, have accumulated in the cradle 20, as by a corresponding number of successive operations of the fork 19. As shown, the countershaft 81 is driven from the countershaft 61. To this end a sprocket wheel 84 is fixed upon the countershaft 81, and a sprocket wheel 85 is loosely mounted upon the countershaft 61. These sprocket wheels are connected in the usual way by a sprocket chain 86 (Figs. 1 and 9).

Clutch mechanism is provided for causing the sprocket wheel 85 to turn with the countershaft 61 whenever it is desired that the countershaft 81 should be rotated for operating the shock-forming mechanism. This clutch mechanism conveniently comprises a ratchet wheel 87, fixed upon the countershaft 61, and a pawl arm 88 carried by the sprocket wheel 85. Normally the pawl arm 88 is held out of engagement with the ratchet wheel 87 by a laterally movable cam finger 89. This cam finger is pivotally connected to a fixed part of the frame of the machine, as at 90 (Fig. 6). It is normally held in proper position to support the pawl arm 88 by a spring 91. As shown, one end of the spring 91 is attached to the standard 82. A ratchet wheel 92, having a laterally directed cam lug 93, is provided for withdrawing the cam finger 89 from beneath the pawl arm 88 after a given number of operations of the fork 19. As shown, this ratchet wheel is journaled upon a part of the standard 82 in rear of the countershaft 81. It is rotated by an eccentric 94 mounted on the sleeve 64. Preferably the arrangement is such that the ratchet wheel 92 is advanced through a distance corresponding to the spacing of its ratchet teeth at each revolution of the sleeve 64. For this purpose the eccentric 94 actuates a pawl arm 95. The pawl arm 95 coöperates with the teeth of the ratchet wheel 92. The rear end of the pawl arm is formed into an eccentric strap 96 which surrounds the eccentric 94. A spring 97 bears upon the pawl arm 95 to hold it in engagement with the periphery of the ratchet wheel 92.

A rock shaft 98 is actuated by the cam lug 93 at each revolution of the ratchet wheel 92, to withdraw the cam finger 89 from beneath the pawl arm 88. As shown, this rock shaft is journaled in bearing lugs 99 and 100 formed upon the side of the standard 82. The rock shaft 98 has two crank arms, designated 101 and 102, respectively. One of these crank arms, as 101, extends into the path of the cam lug 93 and coöperates therewith. The other crank arm, as 102, bears against the cam finger 89. By providing the ratchet wheel 92 with a number of teeth equal to the number of bundles of grain required to form a shock, the cam finger 89 will be withdrawn from beneath the pawl arm 88 and the cradle 20 operated to discharge its load upon the ground whenever the fork 19 has been operated a sufficient number of times to deposit this number of bundles in the cradle. It will be understood that with the parts arranged as shown the shock-forming cradle is tilted and restored during one revolution of the countershaft 61. At the completion of this revolution the pawl arm 88 rides upon the point of the cam finger 89 (Fig. 6), and is thereby raised out of engagement with the ratchet wheel 82, thus bringing the countershaft 81 to rest.

A pair of mutilated gears 103, 104, are mounted on the countershaft 81 for tilting the cradle 20. These gears are so arranged as to successively turn a crank shaft 105 in opposite directions during a single continuous revolution of the countershaft 81 in one direction. The crank shaft 105 is preferably located in rear of the countershaft 81. As shown it is journaled upon a part of the standard 83, and also in a bearing bracket 106 which is mounted upon the side sill 12. It carries a crank arm 107 at its outer end.

This crank arm is connected to the crank arm 55 by a link 108. Rotation of the crank shaft 105 thereby turns the arm 21 to tilt the cradle 20. The mutilated gear 103 is arranged to directly engage a pinion 109 on the crank shaft 105, and thereby turns the crank shaft 105 in the proper direction to restore the cradle 20 to its position above the arm 21 after it has been tilted to discharge its load upon the ground. The mutilated gear 104 turns the crank shaft 105 through an intermediate gear pinion 110, which in turn meshes with a gear 111 on the crank shaft. The mutilated gear 104 thus serves to turn the crank shaft 105 in the proper direction to tilt the cradle to discharge its load upon the ground. For this purpose it is so mounted upon the countershaft 81 as to operate in advance of the gear 103 at each revolution of the countershaft. The intermediate gear 110 is preferably mounted upon a bearing bracket 112 (Fig. 5). This bracket is mounted upon a fixed part of the frame of the machine, as the side sill 12.

In order that the cradle 20 shall be permitted to swing downwardly as rapidly as the weight of its load may require, provision is made for permitting the crank shaft 105 to turn in advance of the gear 111. To this end the gear 111 is loosely mounted on the crank shaft 105, and its hub is provided with a recess 113 for receiving a pin 114 mounted in the crank shaft. A spring 115 (Fig. 8) coiled about the crank shaft 105 adjacent the gear 111, and having one end fixed in the crank shaft and the other end bearing upon a spoke of the gear 111, serves to normally hold the gear in such a position upon the crank shaft that the pin 114 is engaged with one end of the recess 113. The turning of the gear 111 thereby rotates the crank shaft 105, while still permitting the crank shaft to turn in advance of the gear.

Preferably provision is made for swinging the arms 26, 27, to compress the contents of the cradle 20 during its tilting. To this end the means provided for actuating the arms 26, 27, is most conveniently mounted upon the countershaft 81. As shown, this means takes the form of a cam 116 (Fig. 6). This cam serves for turning a rock shaft 117. The rock shaft 117 is preferably journaled in a fixed part of the frame of the machine, as the bearing bracket 118 (Fig. 6), and has a pair of crank arms 119 and 120 fixed upon it. One of these crank arms, as 119, carries a cam roller 121 which runs upon the cam 116. The other crank arm, as 120, is connected to one arm of a bell crank lever 122, as by a link 123 (Fig. 4). Preferably the bell crank lever 122 is arranged to swing in a horizontal plane, as by being pivotally mounted upon a bearing bracket 123ᵃ which is fixed to the side sill 12. The other arm of the bell crank lever 122 is connected to the lever 45 by a pull rod 124. Preferably a section of the pull rod 124 is made in the form of a spring, as shown at 125, to compensate for variations in the bulk of the contents of the cradle 20.

Most desirably a latch is provided for preventing the cradle 20 from being tilted by the weight of its load when the countershaft 81 is at rest. As shown, a latch arm 126 is mounted on the crank shaft 105 adjacent the crank arm 107. This latch arm is normally supported upon the higher end of a spring latch member 127, and thereby prevents the turning of the crank shaft 105 in the direction to tilt the cradle. Preferably the spring latch member 127 is pivotally mounted upon the side of the bracket 106, as appears at 128 (Figs. 4 and 10). A spring 129 reacts between the lower end of the latch member 127 and a fixed stop 130 mounted upon the under side of the sill 12 to normally hold the latch in the path of the arm 126.

Mechanism operated upon the turning of the countershaft 81 is provided for withdrawing the latch member 127 from beneath the arm 126. As shown, this mechanism includes a cam 131 and a rock shaft 132. The cam 131 is mounted upon the countershaft 81 and turns with it. The rock shaft 132 is journaled in a bearing bracket 133 which rises from the side sill 12. One of the arms of this rock shaft carries a roller 133ᵃ which coöperates with the cam 131. The other arm of the rock shaft 132 is connected to the latch member 127 by a link 134. Preferably the cam 131 is so positioned upon the countershaft 81 that it swing the rock shaft 132 to withdraw the latch member 127 as soon as the countershaft 81 begins to turn and before any of the gear teeth of the mutilated gear 104 comes into engagement with the gear teeth of the pinion 110.

In order that the shock may have an opportunity to settle into position upon the ground before it is released by the cradle 20, provision is preferably made for moving the cradle 20 longitudinally with respect to the frame 10 of the harvesting machine when the cradle has been brought to its upright discharging position. This longitudinal movement of the cradle is such that when the cradle has been tilted to its discharging position it is momentarily at rest with respect to the ground over which the harvesting machine travels. The longitudinal movement of the cradle is preferably obtained by moving both ends of the arm 21. The outer end of the arm is moved by means of a link 135 (Fig. 1). This link is attached to a collar 136 which loosely surrounds the arm 21 adjacent the hub of the supplemental carrying wheel 22. Longitudinal movement of the link 135 effects a corresponding movement in the outer end of the arm 21, the movement of the carrying wheel 22 being momentarily interrupted or accelerated to accommodate this movement in the outer end of the arm.

In the form of construction illustrated in Fig. 4 of the drawings, the inner end of the arm 21 is moved by swinging the link 23. Preferably such movement of the link 23 and also the movement of the link 135 is obtained from a cam 137 mounted upon the countershaft 81. As shown, the cam 137 takes the form of a disk having cam lugs 138 and 139 which project upon its opposite faces. These cam lugs coöperate with the two arms 140 and 141, respectively, of a bifurcated lever 142. The lever 142 is pivoted intermediate its ends upon a fixed part of the frame of the machine, as upon a forwardly projecting part 143 of the bracket 133. The lower end of this lever is connected to the link 23, as by a rod 144 (Fig. 4). One of the arms, as 141, of the bifurcated end of the lever 142, is connected to a rod 145 which extends longitudinally through the machine to its forward end, as appears in Fig. 1. A bell crank lever 146, pivoted to swing in a horizontal plane, has one of its arms connected with the rod 145 and the other arm connected with the link 135. This bell crank lever may be pivotally mounted upon any fixed part of the frame of the machine, as upon a bracket 147, mounted upon the side sill 12 adjacent its forward end.

The cam lugs 138 and 139 of the cam disk 137 act upon the two arms of the lever 142 in alternation to swing the lever in opposite directions. The cam lug 138 coöperates upon the arm 140 to swing the lever 142 in the proper direction to draw the arm 21 backwardly, as by pulling upon the link 23 and pushing upon the link 135. This backward movement of the arm 21 causes the cradle 20 to remain at rest with respect to the ground over which the harvesting machine is traveling at the moment of discharging its load upon the ground. When the cradle has discharged its load upon the ground the arm 21 is returned to its forward position, as by the operation of the cam lug 139 upon the arm 141 of the lever 142.

If desired the link 23 may be displaced by a bearing block which provides a movable support for the inner end of the arm 21 by having a longitudinal sliding movement in the frame of the machine. This form of construction is shown in Fig. 11 of the drawings, wherein the inner end of the arm 21 is attached to a bearing block 148. The bearing block 148 is slidingly supported beneath the sill 12, as by being gibbed over a yoke 149 which is secured to the under side of the sill 12 and depends therefrom. In this form of construction the inner end of the arm 21 is longitudinally moved by connecting the rod 144 to the bearing block 148.

I claim as my invention—

1. In a shock former, in combination, a tilting cradle movable between a horizontal position and an upright position about an axis which is below the cradle in its horizontal position whereby the latter part of the tilting movement may be effected by gravity, a latch normally holding the cradle against tilting, mechanism for tilting the cradle including a pair of elastically connected members, a stop limiting the relative movement of the said elastically connected members, one of the said elastically connected members being connected with the cradle, and means for releasing the latch and driving the other one of said elastically connected members operable in succession in the order named.

2. In a shock former in combination, a traveling frame, a cradle transversely pivoted in the frame and having its rear end open and normally occupying a substantially horizontal position, operating means for tilting the cradle backwardly about its pivot to discharge its load, through its top by the forward travel of the frame when the contents of the cradle is engaged with the ground, means for laterally compressing the contents of the cradle during the said tilting, a spring acting to release the said compressing means when the cradle occupies an upright position, and means for moving the cradle backwardly with respect to the frame when the cradle occupies an upright position.

3. In a shock former in combination, a traveling frame, a cradle transversely pivoted in the frame and normally occupying a substantially horizontal position with its axis parallel to the direction of travel of the frame and constructed to discharge its load when tilted to an upright position, a shaft, operative connection between the shaft and the cradle whereby the cradle is tilted and restored by the turning of the shaft in opposite directions, a countershaft rotatable in one direction only, a pair of gears on the first named shaft, a pinion meshing with one of the gears, a mutilated gear on the countershaft directly engageable with the other gear on the first named shaft during a part of each revolution of the countershaft, and a second mutilated gear on the countershaft engageable with the said pinion during a different part of each revolution of the countershaft and means for reciprocating the cradle when the cradle occupies said upright position said reciprocating means acting to move the cradle backwardlly with respect to the frame and restore it to its normal position with respect to the frame.

4. In a shock former, in combination, a traveling frame, a trough-shaped cradle transversely pivoted in the frame and having its rear end open and normally occupying a substantially horizontal position, operating means for tilting the cradle backwardly about its pivot to an upright position for the discharge of its load through its top by the forward travel of the frame when the contents of the cradle is engaged with the ground, means for laterally compressing the contents of the cradle during the said tilting, a spring acting to release the said compressing means when the cradle occupies the said upright position, and means for reciprocating the cradle when the cradle occupies said upright position, said reciprocating means acting to move the cradle backwardly with respect to the frame and restore it to its normal position with respect to the frame.

5. In a shock former, in combination, a traveling frame, a link hanging from a transverse pivot at one side of the frame, an arm projecting laterally outward from the said side of the frame, the inner end of the arm being supported by the said link, a carrying wheel supporting the outer end of the arm, a tilting cradle mounted on the arm, and means for swinging the said link to move the said arm relatively to the frame parallel to the direction of travel of the frame.

6. In a shock former, in combination, a tilting cradle movable between a horizontal position and an upright position about an axis which is below the cradle in its horizontal position whereby the latter part of the tilting movement may be effected by gravity, mechanism for tilting the cradle including a pair of elastically connected members, one thereof being connected with the cradle and the other being driven, and a stop limiting the relative movement of the said elastically connected members.

LOUIS ANDERSON.

Witnesses:
CHARLES B. GILLSON,
E. M. KLATCHER.

Copies of this patent may be obtained for five cents each, by addressing the "Commissioner of Patents, Washington, D. C."